US010284823B1

(12) United States Patent
Amarilio et al.

(10) Patent No.: US 10,284,823 B1
(45) Date of Patent: May 7, 2019

(54) CAPTURING PHOTOGRAPHS BASED ON ROTATION OF DEVICE

(71) Applicant: Google Inc., Mountain View, CA (US)

(72) Inventors: Omri Amarilio, Palo Alto, CA (US); Katie Leah Roberts-Hoffman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/291,837

(22) Filed: Oct. 12, 2016

(51) Int. Cl.
*H04N 5/225* (2006.01)
*H04N 7/18* (2006.01)
*H04N 5/232* (2006.01)
*H04N 5/235* (2006.01)
*H04N 9/12* (2006.01)
*H04N 9/04* (2006.01)
*G06K 9/62* (2006.01)
*G06K 9/78* (2006.01)

(52) U.S. Cl.
CPC ............... *H04N 7/188* (2013.01); *G06K 9/62* (2013.01); *G06K 9/78* (2013.01); *H04N 5/2252* (2013.01); *H04N 5/2253* (2013.01); *H04N 5/2256* (2013.01); *H04N 5/2354* (2013.01); *H04N 5/2356* (2013.01); *H04N 5/23293* (2013.01); *H04N 9/045* (2013.01); *H04N 9/12* (2013.01)

(58) Field of Classification Search
CPC .. H04N 5/64; H04N 5/23238; H04N 1/00557; H04N 1/00559; G06K 9/209; G06F 3/005; G06F 1/1666; G06F 1/1675; G06F 1/1686; G06F 1/1616; G06T 3/60; G06T 3/40
See application file for complete search history.

(56) References Cited

U.S. PATENT DOCUMENTS

| | | | | |
|---|---|---|---|---|
| 8,339,683 | B2* | 12/2012 | Fiul | G06F 1/1616 358/442 |
| 9,594,970 | B2* | 3/2017 | Osborne | G06K 9/209 |
| 9,785,195 | B2* | 10/2017 | Amarilio | G06F 1/1666 |
| 10,021,296 | B2* | 7/2018 | Fan | H04N 5/23238 |
| 2002/0082043 | A1 | 6/2002 | Wilska | |
| 2009/0231483 | A1* | 9/2009 | Seddik | H04N 5/2256 348/373 |
| 2011/0249042 | A1* | 10/2011 | Yamamoto | G09G 3/342 345/690 |

(Continued)

OTHER PUBLICATIONS

Selfie App: Takes Photo When You Open MacBook Lid, Jan. 21, 2015, Cupertino Times.*

(Continued)

*Primary Examiner* — Kelly L Jerabek
(74) *Attorney, Agent, or Firm* — Brake Hughes Bellermann LLP

(57) ABSTRACT

A portable computing device may include a lid and a base. The lid may include a display and a camera on a front side of the lid. The base may include a keyboard on a top side of the base and a processor inside the base. The processor may be coupled to the display, the camera, and the keyboard. The processor may be configured to determine that the front side of the lid is rotating toward the top side of the base, and instruct the camera to capture at least a first photograph and a second photograph based on the determination that the front side of the lid is rotating toward the top side of the base.

21 Claims, 13 Drawing Sheets

(56) References Cited

U.S. PATENT DOCUMENTS

| | | | | |
|---|---|---|---|---|
| 2012/0062691 A1* | 3/2012 | Fowler | ............... | F16M 11/10 |
| | | | | 348/36 |
| 2012/0262600 A1* | 10/2012 | Velarde | ............ | H04N 5/2355 |
| | | | | 348/223.1 |
| 2014/0098188 A1* | 4/2014 | Kwak | .................. | G06T 3/40 |
| | | | | 348/38 |
| 2015/0070271 A1* | 3/2015 | Chen | .................. | G06F 3/005 |
| | | | | 345/156 |
| 2016/0283781 A1* | 9/2016 | Kurakane | ............ | H04N 7/18 |

OTHER PUBLICATIONS

"High-dynamic-range imaging", From Wikipedia, the free encyclopedia, retrieved on Sep. 23, 2016 from https://en.wikipedia.org/wiki/high-dynamic-range_imaging, Sep. 23, 2016, 9 pages.

"Taking Pictures With Your MacBook Every Time the Lid Opens", Hacker News, retrieved on Aug. 7, 2018 from https://news.ycombinator.com/item?id=2089294, 4 pages.

* cited by examiner

CAPTURING PHOTOGRAPHS BASED ON ROTATION OF DEVICE

TECHNICAL FIELD

This description relates to computing devices with built-in cameras.

BACKGROUND

Users may write notes by hand onto media such as paper. It can be cumbersome to make high-quality photographs of these notes electronically accessible.

SUMMARY

According to one example, a portable computing device may include a lid and a base. The lid may include a display and a camera on a front side of the lid. The base may include a keyboard on a top side of the base and a processor inside the base. The processor may be coupled to the display, the camera, and the keyboard. The processor may be configured to determine that the front side of the lid is rotating toward the top side of the base, and instruct the camera to capture at least a first photograph and a second photograph based on the determination that the front side of the lid is rotating toward the top side of the base.

According to another example, a non-transitory computer-readable storage medium may comprise instructions stored thereon. When executed by at least one processor, the instructions may be configured to cause a computing system to at least determine that a front side of a lid of the computing system is rotating toward a top side of a base of the computing system. The front side of the lid may include a camera. The base may be rotatably connected to the lid. The instructions may also be configured to cause the computing system to capture, by the camera, at least a first photograph and a second photograph based on the determination that the front side of the lid is rotating toward the top side of the base.

According to another example, a non-transitory computer-readable storage medium comprising instructions stored thereon. When executed by at least one processor, the instructions may be configured to cause a computing system to at least determine that a camera included in the computing system is rotating, capture, by the camera, at least a first photograph and a second photograph based on the determination that the camera is rotating, and generate a single image based on the first photograph and the second photograph, the single image including only content that is included in both the first photograph and the second photograph.

According to another example, a non-transitory computer-readable storage medium may comprise instructions stored thereon. When executed by at least one processor, the instructions may be configured to cause a computing system to at least determine that the computing system is rotating, and launch an application based on the determination that the computing system is rotating. The application may be configured to capture, by a camera included in the computing system, at least a first photograph and a second photograph, and generate a single image based on the first photograph and the second photograph, the single image including only content that is included in both the first photograph and the second photograph.

The details of one or more implementations are set forth in the accompanying drawings and the description below.

Other features will be apparent from the description and drawings, and from the claims.

DETAILED DESCRIPTION

A computing device may capture multiple photographs and/or images of handwritten text from different angles, and combine the multiple photographs to create an enhanced image. In an example embodiment, a portable computing device, such as a laptop computer, may respond to the rotation of the device, such as the lid closing and/or rotating toward the base, by capturing multiple photographs via a camera built into the lid. The camera may capture photographs at a high frequency, such as thirty frames per second, allowing many photographs to be captured. The multiple photographs may be captured while the lid is rotating, causing the multiple photographs to capture the multiple photographs at different angles with respect to a target (e.g., text, a planar surface including text). The photographs with different angles may be processed to generate the enhanced image of the target, which may include writing such as text or drawings. The computing device may process the photographs by, for example, performing high-dynamic range (HDR) imaging on the multiple photographs and generating an image in which an entirety of the image is included in at least a first photograph and a second photogram of the multiple photographs.

In an example embodiment, the portable computing device may distinguish between a user moving the lid down to close the portable computing device and moving the lid down to prompt the portable computing device to capture photographs. In an example embodiment, if the lid begins to reopen within a reopen time period after beginning to close, then the portable computing device may respond to the reopening by performing an action in response to the lid beginning to close and then reopening within the reopen time period, such as storing the photographs, generating the enhanced image based on the photographs such as by generating the enhanced image based on differences between the photographs, and/or uploading the photographs to a remote server (which may generate the enhanced image based on differences between the photographs and/or simply store the photographs for later retrieval by the user). In some embodiments, if the lid does not begin to reopen within the reopen time period after beginning to close, then the portable computing device may not generate the enhanced image, and/or may delete the photographs.

Figure 1A:
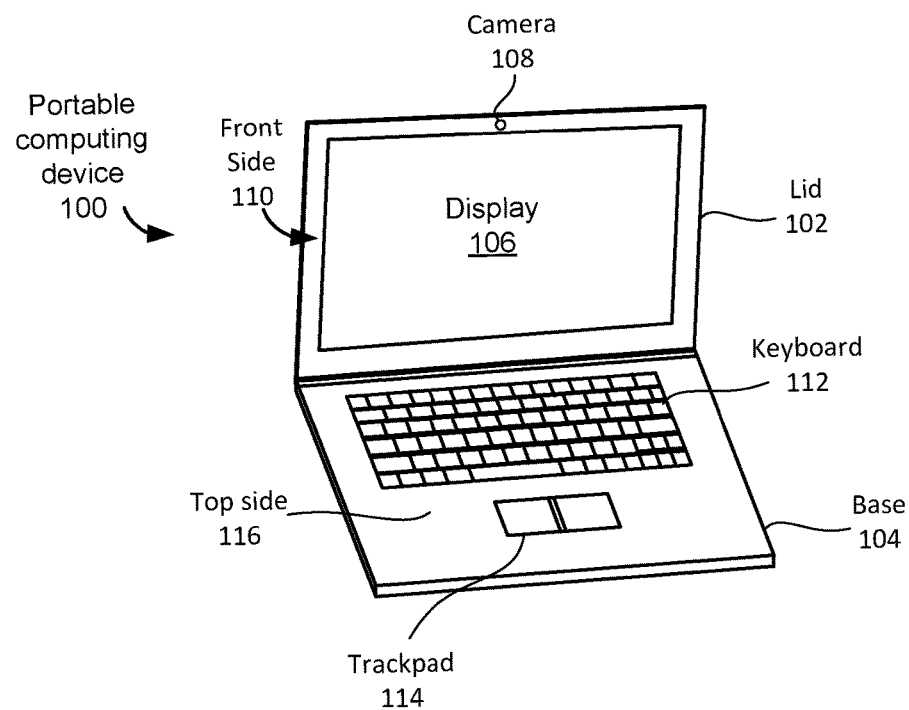
FIG. 1A is a perspective view of a portable computing device according to an example embodiment.
Figure 2A:
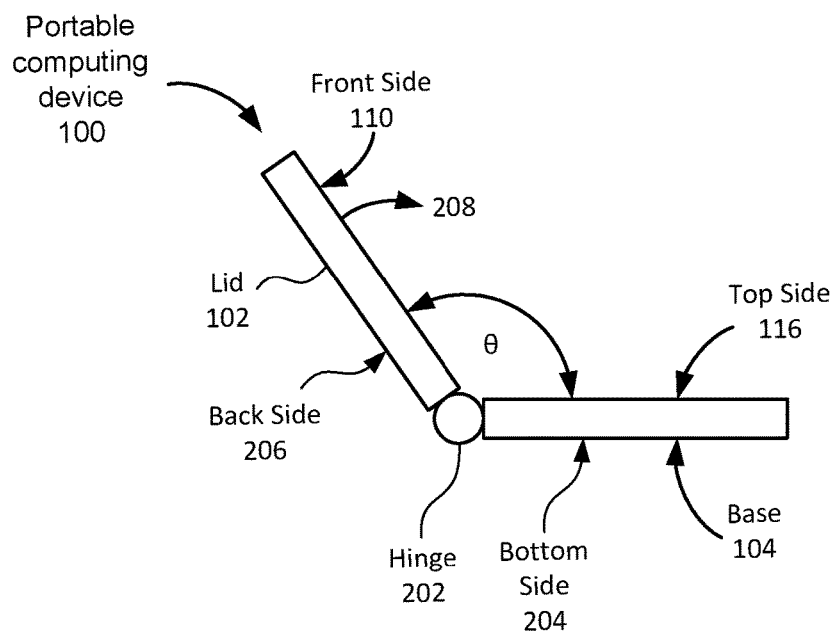
FIG. 2A is a side view showing a lid of the portable computing device rotate toward the base according to an example embodiment.

FIG. 1A is a perspective view of a portable computing device 100 according to an example embodiment. In this example, the portable computing device 100 may include a lid 102 rotatably connected to the base 104. The lid 102 may be rotatably connected to the base 104 by a hinge 202, as shown in the example of FIG. 2A.

The lid 102 may include a display 106 and a camera 108. The display 106 may present graphical output to the portable computing device 100. The camera 108 may capture photographs and thereby receive visual input from outside the portable computing device 100. The camera 108 may include a digital camera, which may include one or more charge-coupled device (CCD) sensors and/or complementary metal-oxide-semiconductor (CMOS) sensors. The camera 108 and display 106 may be included on the front side 110 of the lid 102.

The base 104 may include a keyboard 112 and trackpad 114 on a topside 116 of the base. The keyboard 112 may include multiple keys to receive keystroke input, which may include alphanumeric characters, symbols, and/or modifier key inputs. The trackpad 114 may receive tactile input, such as to control a cursor. The front side 110 of the lid 102 may rotate toward the top side 116 of the base 104 when a user is closing the portable computing device 100 (toward a closed configuration), and away from the top side 116 of the base 104 when the user is opening the portable computing device 100 (toward an open configuration).

The base 104 may also include at least one processor coupled to the keyboard 112, the trackpad 114, the display 106, and the camera 108. The at least one processor may control the functions of, and/or send instructions to, the display 106 and camera 108, and receive input from the camera 108, keyboard 112, trackpad 114, and a sensor included in a hinge (shown in FIG. 2A). The at least one processor may also perform determinations based on received input and generate enhanced images based on photographs captured by the camera 108. The base 104 may also include a non-transitory computer-readable storage medium. The non-transitory computer-readable storage medium may comprise instructions stored thereon that, when executed by the at least one processor, cause the portable computing device 100 to perform any combination of the functions, methods, or techniques described herein.

Figure 1B:
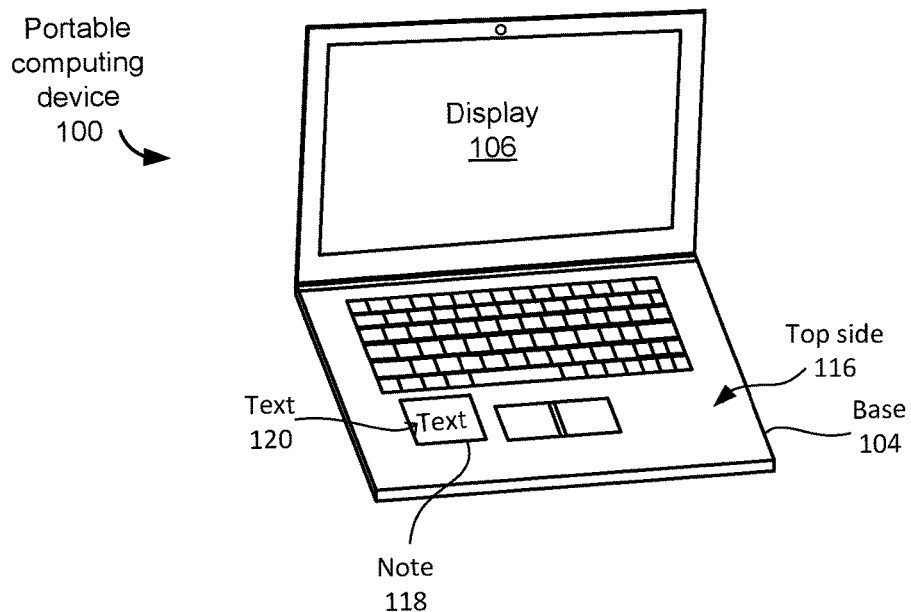
FIG. 1B is a perspective view of the portable computing device with a small note with text placed onto a base of the portable computing device according to an example embodiment.

FIG. 1B is a perspective view of the portable computing device 100 with a note 118 (e.g., a small note) and text 120 placed onto the base 104 of the portable computing device 100 according to an example embodiment. The note 118 may include a piece of paper or other medium onto which a person may write with a pen or pencil, and may or may not include an adhesive on part of the note 118. The user may have handwritten text 120, or other writing such as symbols or drawings, onto the note 118 and placed the note 118 onto the portable computing device 100. The user may wish to input the text 120 into the portable computing device 100. While text 120 is shown in FIG. 1B, the user may have additionally or alternatively written other than text on the note 118, such as drawings, sketches, or symbols.

Figure 1C:
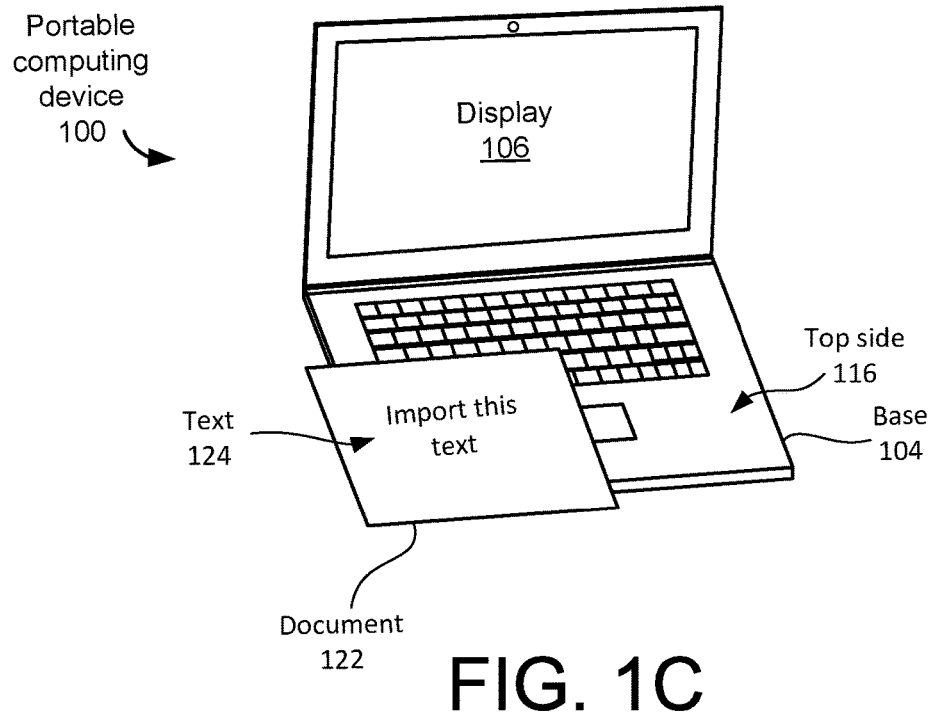
FIG. 1C is a perspective view of the portable computing device with a document with text placed onto the base of the portable computing device according to an example embodiment.

FIG. 1C is a perspective view of the portable computing device 100 with a document 122 with text 124 placed onto the base 104 of the portable computing device 100 according to an example embodiment. The document 122 may include a piece of paper, such as an 8.5×11 inch piece of paper, or other medium onto which a person may write with a pen or pencil. In this example, the user may have written text 124, or other writing such as symbols or drawings, onto the document 122 and placed the document 122 onto the portable computing device 100, and may wish to import the text 124 into the portable computing device 100. While text 124 is shown in FIG. 1C, the user may have additionally or alternatively written other than text on the document 122, such as drawings, sketches, or symbols.

FIG. 2A is a side view showing the lid 102 of the portable computing device 100 rotate toward the base 104 according to an example embodiment. The lid 102 may be rotatably attached to the base 104 by a hinge 202. The hinge 202 may be connected to both the lid 102 and the base 104 at respective ends of the lid 102 and base 104, and may allow the lid 102 to rotate about the hinge 202 with respect to the base 104. As shown in FIG. 2A, when the user is closing the portable computing device 100 and/or wishes to prompt the portable computing device 100 to generate an image of the text 120, 124, the user may apply pressure to the lid 102 to cause the front side 110 of the lid 102 to rotate toward the top side 116 of the base 104 in a direction denoted by the arrow 208, reducing the angle Θ between the lid 102 and the base 104. The hinge 202 may include a sensor that detects the rotation of the lid 102 toward the base 104, and sends a signal to the processor indicating the angle Θ and/or the rate and direction of change of the angle Θ. In an example embodiment, the lid 102 and/or base 104 may include a proximity sensor that determines the proximity of the base 104 or lid 102, and the functions, methods, and/or techniques described herein may be performed with respect to a detected proximity rather than the angle Θ. The reduction of the angle Θ may prompt the at least one processor of the portable computing device 100 to instruct the camera 108 to capture multiple photographs. In an example embodiment, the initiation of the rotation of the lid 102 toward the base 104, and/or the satisfaction by the lid and/or hinge 202 of a predetermined threshold angle Θ, may also begin a reopen time period (shown and described with respect to FIGS. 3A and 3B) during which the portable computing device 100 determines whether the lid 102 rotates in the opposite direction to prompt saving the photographs and/or generating an enhanced image based on the photographs.

In an example implementation, the portable computing device 100 may determine the angle Θ based on an accelerometer input. The accelerometer may be included in the lid 102, and may indicate an angle Θ of the lid 102 with respect to the base 104 or with respect to ground. The accelerometer may, in an example embodiment, indicate an angle Θ, or rate of change of angle Θ, of the camera 108 that is included in the lid 102.

In an example embodiment, the at least one processor of the portable computing device 100 may, based on determining that the front side 110 of the lid 102 is rotating toward the top side 116 of the base 104, instruct the display 106 to increase a brightness of the display 106, and/or present a predetermined brightness (which the display 106 may or may not already be presenting), projecting light onto the note 118 or document 122 to improve the image resulting from the photographs. In an example, the at least one processor of the portable computing device 100 may instruct the display 106 to present a first image, such as a dark display 402, a bright display 404, a bright band 406, or a bright band 410 (shown and described further with respect to FIGS. 4A, 4B, 4C, and 4D), or other images such as a bright square(s) or bright spot(s) in association with instructing the camera 108 to capture a first photograph, and may instruct the display 106 to present a second image, such as a dark display 402, bright display 404, bright band 406, bright band 410, bright square(s), or bright spot(s) which is different than the first image, in association with instructing the camera 108 to capture a second photograph. A portion of the display 106 and/or images presented on the display 106 may have a different intensity of light in the second image than the first image and/or a different color in the second image than the first image.

Figure 2B:
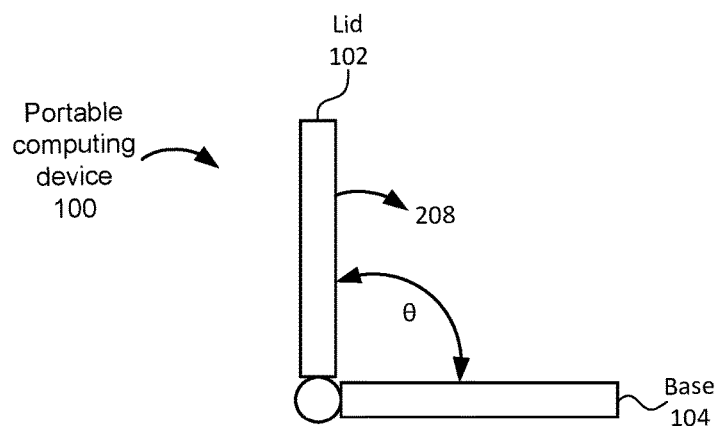
FIG. 2B is another side view showing the lid continue to rotate toward the base from the position shown in FIG. 2A according to an example embodiment.

FIG. 2B is another side view showing the lid 102 rotate toward the base 104 from the position shown in FIG. 2A, according to an example embodiment. As shown in FIG. 2B, the lid 102 continues to rotate toward the base 104 in the direction denoted by the arrow 208, reducing the angle Θ. In the example in which the portable computing device 100 begins capturing photographs after the angle Θ falls below a threshold value, the angle Θ may fall below the threshold value while being rotated in the direction denoted by the arrow 208.

Figure 2C:
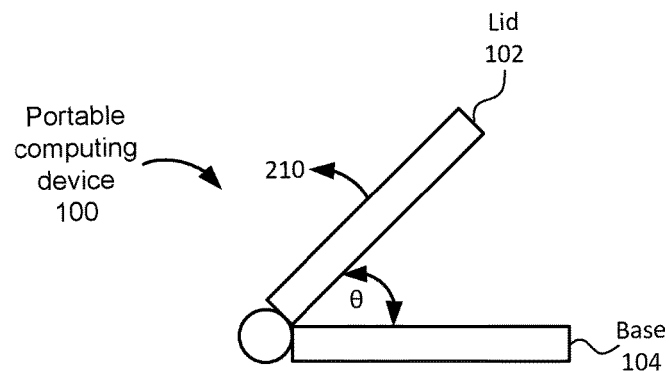
FIG. 2C is another side view showing the lid rotate away from the base from the position shown in FIG. 2B according to an example embodiment.

FIG. 2C is another side view showing the lid 102 rotate away the base 104 from the position shown in FIG. 2B according to an example embodiment. In this example, the user has reversed direction of rotating the lid 102 with respect to the base 104, at this point rotating the lid 102 away from the base 104 in the direction denoted by the arrow 210, increasing the angle Θ. The user may rotate the lid 102 away from the base 104 to prompt the portable computing device 100 to generate an enhanced image of the text 120, 124. As discussed above, the portable computing device 100 may begin capturing photographs in response to the lid 102 rotating toward the base 104, and/or in response to the lid 102 rotating toward the base 104 beyond a predetermined angle Θ. In the example shown in FIG. 2C, the lid 102 may have rotated beyond the predetermined angle Θ, causing the portable computing device 100 to begin taking photographs, and the user may have rotated the lid 102 away from the base 104.

Figure 2D:
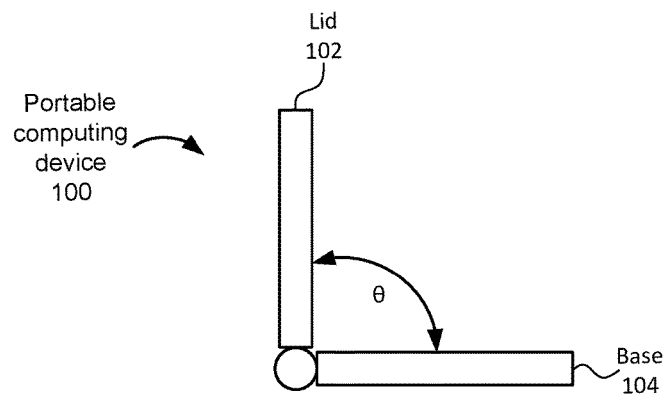
FIG. 2D is another side view showing the lid in a fixed position with respect to the base after rotating away from the base as shown in FIG. 2C according to an example embodiment.

FIG. 2D is another side view showing the lid 102 in a fixed position with respect to the base 104 after the lid 102 has been rotated away from the base as shown in FIG. 2C according to an example embodiment. In this view, the lid 102 may be in a fixed position with respect to the base 104. The user may continue to use the portable computing device 100, and/or may view the enhanced image of the writing such as text 120, 124 generated by the processor based on the multiple photographs.

Figure 2E:
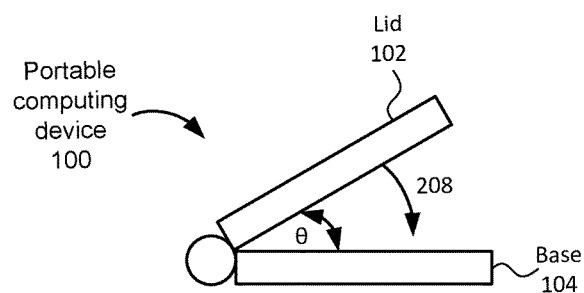
FIG. 2E is another side view showing the lid continue to rotate toward the base from the position shown in FIG. 2B according to an example embodiment.

FIG. 2E is a side view showing the lid 102 continue to rotate toward the base 104 from the position shown in FIG. 2B according to an example embodiment. In this example, the lid 102 continues to rotate in the direction denoted by the arrow 208, reducing the angle Θ. Based on the lid 102 continuing to rotate toward the base 104, the portable computing device 100 may not generate the enhanced image and/or may delete the photographs captured while the lid 102 was initially rotating toward the base 104 (which the portable computing device 100 may have begun capturing in response to the lid 102 beginning to rotate toward the base 104 or in response to the lid rotating beyond the predetermined angle Θ). The portable computing device 100 may not generate the enhanced image and/or may delete the photographs captured while the lid 102 was initially rotating toward the base 104 based on the angle Θ falling below another predetermined angle lower than the predetermined angle at which the portable computing device 100 may begin capturing photographs, or when the portable computing device 100 is closed, at which point the angle Θ is zero, as shown in FIG. 2F.

Figure 2F:
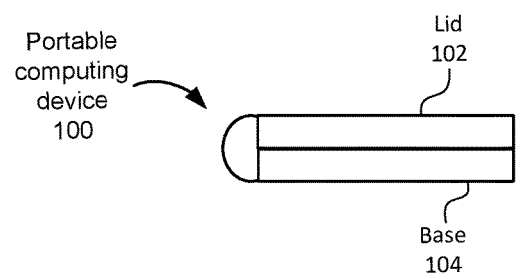
FIG. 2F shows the portable computing device in a closed position after the lid has rotated toward the base from the position shown in FIG. 2E according to an example embodiment.

FIG. 2F shows the portable computing device 100 in a closed position after the lid is rotated toward the base 104 from the position shown in FIG. 2D according to an example embodiment. In this example, the portable computing device 100 is closed, the angle Θ is zero, and the user may stop using the portable computing device 100. In an example embodiment, based on the portable computing device 100 being closed and/or the angle Θ being zero, the portable computing device 100 may not generate the enhanced image and/or may delete the photographs captured while the lid 102 was initially rotating toward the base 104. The portable computing device 100 may enter a low-power state based on the portable computing device 100 being in the closed state.

Figure 3A:
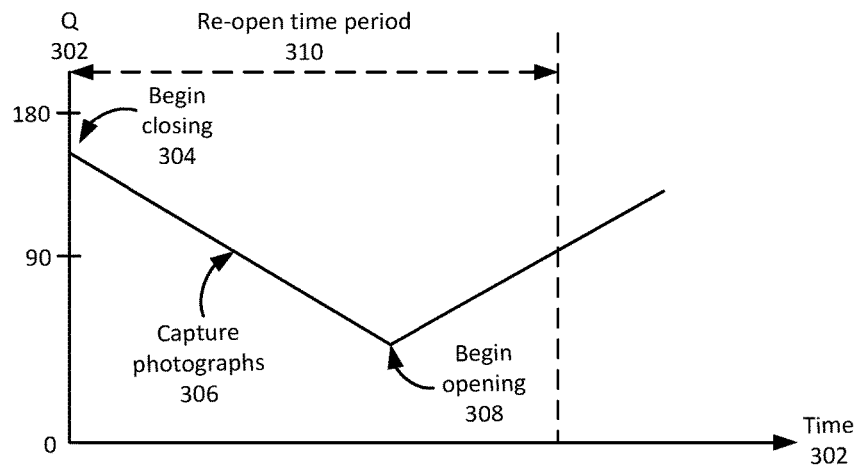
FIG. 3A is a graph showing the angle of the lid with respect to the base as a function of time as shown in FIGS. 2A, 2B, 2C, and 2D according to an example embodiment.

FIG. 3A is a graph showing the angle Θ of the lid 102 with respect to the base 104 as a function of time 302 as shown in FIGS. 2A, 2B, 2C, and 2D according to an example embodiment. In an example implementation shown in FIG. 3A, the portable computing device 100 begins closing (304) at the time when the lid 102 begins rotating toward the base 104, causing the value of the angle Θ to begin decreasing in value. A reopen time period 310 begins at the point when the lid 102 begins closing (304) and/or the angle Θ begins decreasing, and may continue for a predetermined period of time. In an example embodiment, the portable computing device 100 may begin capturing photographs and initiate the reopen time period in response to the angle Θ falling below a predetermined value, rather than in response to the angle Θ decreasing from any value. While the lid 102 is closing (and/or the angle Θ is decreasing) and the time 302 is still within the predetermined time period 310, the portable computing device 100 may capture multiple photographs (306). In an example embodiment, the portable computing device 100 may capture photographs (306) only if the angle Θ, at the time the lid begins closing and/or the angle Θ begins decreasing, is at least a threshold value, such as 60° or 90°, to ensure that the user had the portable computing device 100 open and intended to capture photographs.

In an example embodiment, the portable computing device 100 may also present multiple, different images on the display 106, as shown and described with respect to FIGS. 4A, 4B, 4C, and 4D, while the camera 108 is capturing the multiple photographs. The different images presented on the display 106 may cause the lighting on the text 120, 124 to be different for the different photographs, as shown and described with respect to FIGS. 5A and 5B, enabling the portable computing device 100 to further enhance the quality of the resulting image.

In this example, the user begins opening (308) the portable computing device 100 by causing the lid 102 to rotate away from the base 104, increasing the value of the angle Θ. Based on the user beginning to open (308) the portable computing device 100 during the reopen time 310 and/or the angle Θ increasing, the portable computing device 100 may process the photographs, such as by storing the photographs in a particular drive or storage location and/or generating an enhanced image of the photographs.

In an example embodiment, after capturing one or more photographs, the portable computing device 100 may determine whether to continue capturing photographs, and/or whether to generate an enhanced image based on the photographs, based on the content of the photographs. The portable computing device 100 may determine whether the photographs include text or other writing, or a picture or other image on the note 118 or document 122, and/or whether any paper or other medium onto which a user could write is included in the photographs, such as by recognizing the text or paper by an image processing algorithm. If the photographs do not include text or other writing or paper or other medium, the portable computing device 100 may stop capturing photographs, may discard or delete the photographs, and/or not generate and enhanced image based on the photographs. The portable computing device 100 may identify the objects in the photographs such as paper or other medium and/or text, or may compare the photographs to previous photographs or other images (capture during a previous closing and reopening of the lid 102) to determine whether the photographs include anything other than human hands or fingers on top of the top side 116 of the base 104, such as by an image processing algorithm to recognize objects other than the base 104 (including the keyboard 112 and trackpad 114) and human hands or fingers.

Figure 3B:
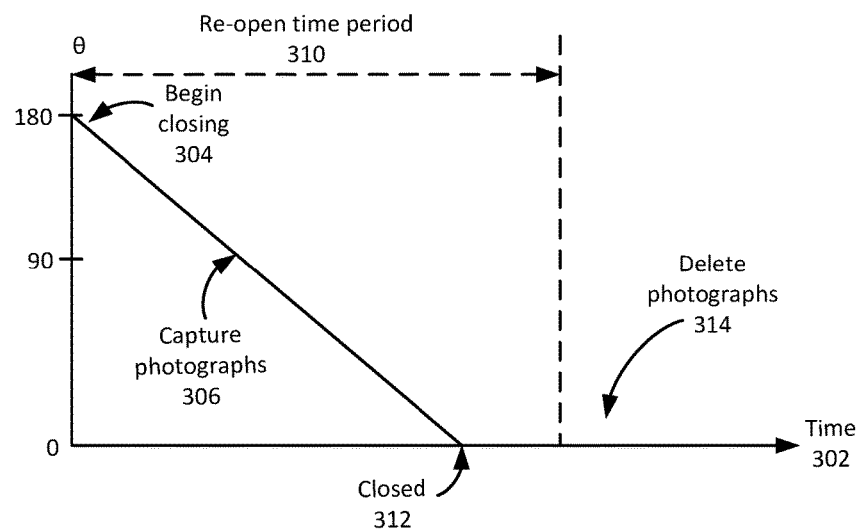
FIG. 3B is a graph showing the angle of the lid with respect to the base as a function of time as shown in FIGS. 2A, 2B, 2E, and 2F according to an example embodiment.

FIG. 3B is a graph showing the angle Θ of the lid 102 with respect to the base 104 as a function of time 302, as shown in FIGS. 2A, 2B, 2E, and 2F according to an example embodiment. In this example, as in the example of FIG. 3A, the user begins closing (304) the portable computing device 100. The closing (304) of the portable computing device 100 may initiate the reopen time period 310. After the user begins closing (304) the portable computing device 100, the portable computing device 100 begins capturing photographs (306), as discussed above with respect to FIG. 3A. The portable computing device 100 may also present multiple modified images in the display 106 and/or determine the content of the photographs during the reopen time period 310, as discussed above with respect to FIG. 3A. In the example of FIG. 3B, the portable computing device 100 becomes closed (312) when the lid 102 contacts the base 104 and the angle Θ becomes zero. Also in this example, the portable computing device 100 did not begin reopening, and/or the angle Θ did not begin increasing, within the reopen time period 310. Based on the portable computing device 100 not beginning to reopen within the reopen time period 310, the portable computing device 100 may determine that the user did not intend to capture any text or other writing and was instead simply closing the portable computing device 100, and may not generate and enhanced image based on the photographs, and/or may discard or delete the photographs (314).

As discussed above, while the portable computing device 100 is closing, the display 106 may present multiple different images. The different images may cause different intensities of light and/or light of different color spectra to be transmitted from the display 106 to the note 118 or document 122, and/or may change an angle at which beams of light are transmitted to the note 118 or document 122. The different intensities, color spectra, and/or angles may be captured by different photographs, providing more different samples from which the portable computing device 100 may generate the enhanced image. FIGS. 4A, 4B, 4C, and 4D show examples of different images that the display 106 may present to change the intensities and/or color spectra of light captured by the different photographs. The images may be presented in quick succession, with little change in the angle Θ for different images displayed in association with multiple captured photographs, and/or may be presented for different angles Θ with respect to the base 104 or ground.

Figure 4A:
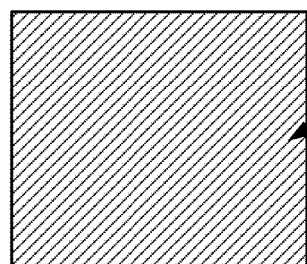
FIG. 4A shows a display of the portable computing device in a dark state according to an example embodiment.

FIG. 4A shows a display 106 of the portable computing device 100 in a dark state according to an example embodiment. In this example, the display 106 may be considered a dark display 106, in that the display 106 is not emitting light and/or a relatively small amount of light. The portable computing device 100 may place the display 106 in the dark state in association with capturing one or more photographs in response to the lid 102 closing, so that the only light scattering from the note 118 or document is light generated from sources other than the portable computing device 100.

Figure 4B:
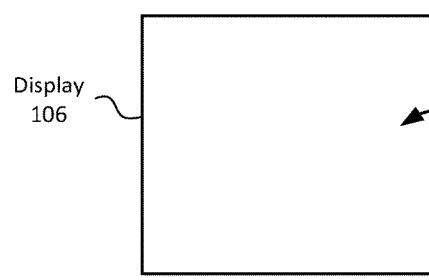
FIG. 4B shows the display in a bright state according to an example embodiment.

FIG. 4B shows the display 106 in a bright state according to an example embodiment. In this example, the display 106 may be considered a bright display 404, in that the display 106 is emitting a relatively large amount of light. In one example, a total intensity of light as measured in lumens may be greater in a bright display 404 than in a dark display 402 (such as an increase in lumens by an absolute value such as one lumen or an increase by a factor such as twice as many lumens, three times as many lumens, or ten times as many lumens). In an additive color model example in which the pixels emit light in three color spectra such as red, green, and blue, a bright display 404 may have a higher average or total of the contributing colors, a higher minimum of the contributing colors, or a higher maximum of the contributing colors, than a dark display 402. The portable computing device 100 may place the display 106 in the dark state in association with capturing one or more photographs in response to the lid 102 closing, so that the display 106 acts as a flash for the camera 108, transmitting light toward the note 118 or document 122 that will be scattered from the note 118 or document 122 toward the camera 108.

Figure 4C:
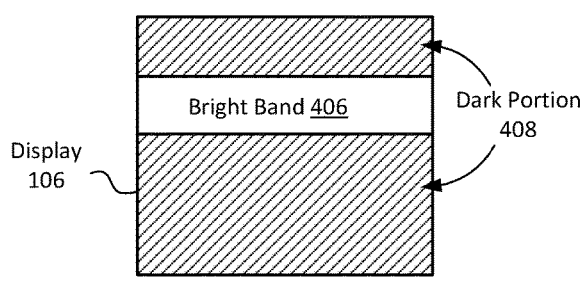
FIG. 4C shows the display with a bright band according to an example embodiment.

FIG. 4C shows the display 106 with a bright band 406 according to an example embodiment. In this example, the bright band 406 is in a first position on the display 106, which is in an upper half of the display 106. The bright band 406 may be surrounded by a dark portion 408 of the display 106. The dark portion 408 may occupy portions of the display 106 other than the bright band 406. The bright band 406 may be relatively brighter and/or more intense than the dark portion 408, and may have a higher intensity of light than the dark portion 408 and/or, in an additive color model example in which the pixels emit light in three color spectra such as red, green, and blue, a bright band 406 may have a higher average or total of the contributing colors, a higher minimum of the contributing colors, or a higher maximum of the contributing colors, than the dark portion 408, as discussed above with respect to the bright display 404 compared to the dark display 402. The bright band 406 may transmit a narrower beam of light toward the note 118 or document 122 than the bright display 106, causing the camera to capture a photograph with different scattered light than when the bright display 404 is transmitting light toward the note 118 or document 122.

Figure 4D:
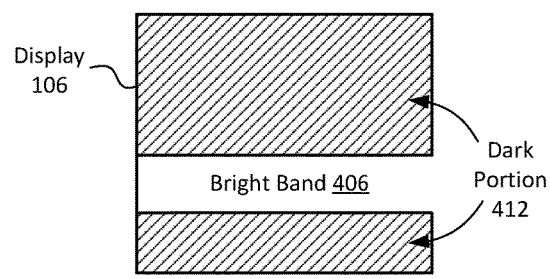
FIG. 4D shows the display with a bright band in a different position than the bright band in FIG. 4C according to an example embodiment.

FIG. 4D shows the display with a bright band 410 in a different position than the bright band 406 in FIG. 4C according to an example embodiment. In this example, the bright band 410 is in a lower half of the display 106, and the dark portion 412 may occupy portions of the display 106 other than the bright band 410. The bright band 410 may be relatively brighter and/or more intense than the dark portion 406, and may have a higher intensity of light than the dark portion 412 and/or, in an additive color model example in which the pixels emit light in three color spectra such as red, green, and blue, a bright band 410 may have a higher average or total of the contributing colors, a higher minimum of the contributing colors, or a higher maximum of the contributing colors, than a dark portion 412 of the display 106, as discussed above with respect to FIGS. 4A, 4B, and 4C. The presenting of bright bands 406, 410 by the display 106 at different locations in association with different photographs may cause beams of light to be transmitted from different locations on the display 106 to the note 118 or document 122, causing light to be scattered from the note 118 or document 122 to the camera 108 at different intensities for different photographs. The camera 108 taking multiple photographs with light scattering from the note 118 or document 122 at different intensities may enable the portable computing device 100 to construct high quality images from the multiple photographs that have different lighting. The camera 108 may capture photographs at a high frequency, such as thirty frames per second, allowing multiple photographs to be captured with different lighting generated by the display 106 with little movement by the lid 102 between photographs.

In addition to changing the intensity of the light emitted by the display 106, the portable computing device 100 may change the color spectra of light emitted by the display 106 while the camera 108 is capturing photographs (306), in association with each photograph captured by the camera 108. In an additive color model example in which the pixels emit light in three color spectra such as red, green, and blue, the portable computing device 100 may change the distribution of colors emitted by the pixels on the display 106 in association with different photographs, enhancing out certain colors and suppressing other colors. For example, some cameras include more green sensors than sensors for red and blue, so the pixels in the display 106 may emit more or less in the green spectrum to compensate for the greater sensitivity of the camera 108 in the green spectrum. The different colors may enable the portable computing device 100 to generate enhanced images by canceling light generated from outside light sources and/or increasing the light reflecting from the note 118 or document 122.

Figure 5A:
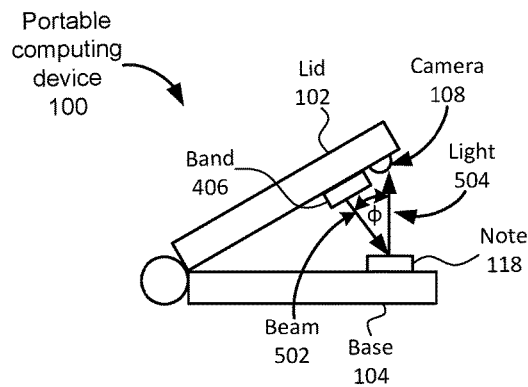
FIG. 5A shows a beam of light propagating from the bright band of FIG. 4C to a note on the base of the portable computing device, and light scattering from the note to a camera of the portable computing device, according to an example embodiment.

FIG. 5A shows a beam 502 of light propagating from the bright band 406 of FIG. 4C to the note 118 on the base 104 of the portable computing device 100, and light 504 scattering from the note 118 to the camera 108 of the portable computing device 100. While beams of light may propagate from the bright band 406 in many different directions, and light may scatter from the note 118 in many different directions, the beam 502 from the bright band 406 to the note 118 and the scattered light 504 from the note 118 to the camera 108 are shown in FIG. 5A for illustrative purposes. As shown in FIG. 5A, an angle of reflection between the beam 502 of light and the scattered light 504 may form an angle $\Phi$. An intensity of light scattered from the note 118 to the camera 108 may be a function of a cosine of the angle $\Phi$.

Figure 5B:
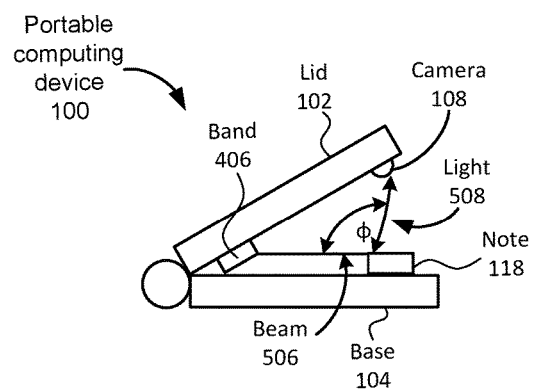
FIG. 5B shows a beam of light propagating from the bright band of FIG. 4D to the note, and light scattering from the note to the camera, according to an example embodiment.

FIG. 5B shows a beam 506 of light propagating from the bright band 410 of FIG. 4D to the note 118, and light 508 scattering from the note 118 to the camera 108. As discussed above with respect to FIG. 4D, the bright band 410 is in a different location than the bright band 406, causing the angle $\Phi$ in the example of FIG. 5B to be different than the angle $\Phi$ in the example of FIG. 5A. The different angle causes the intensity of light scattered from the note 118 to the camera to be different in the example of FIG. 5B than in the example of FIG. 5A, causing the image of a second photograph captured by the camera 108 in the example of FIG. 5B to be different than the image of a first photograph captured by the camera 108 in the example of FIG. 5A. A speed at which the camera 108 captures successive photographs and the display 106 creates bright bands 406, 410 may cause the angle $\Theta$ between the lid 102 and base 104 to be substantially the same in the first photograph and second photograph. The portable computing device 100 may construct an improved image using the two different photographs from FIGS. 5A and 5B, which were captured with the same angle $\Theta$ but different intensities of light scattering from the note 118 caused by the different angles $\Phi$, as well as photographs that were captured with different angles $\Theta$ and same or different intensities of light scattering from the note 118, using image enhancement techniques such as high-dynamic range (HDR) imaging.

Figure 6:
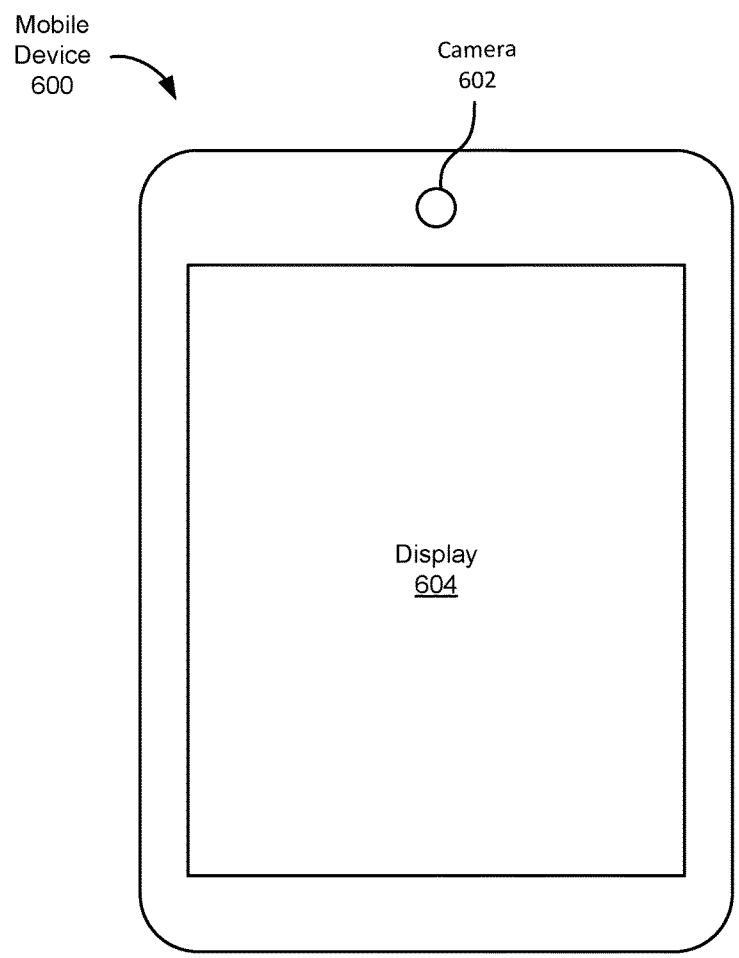
FIG. 6 shows a mobile device according to an example embodiment.

FIG. 6 shows a mobile device 600 according to an example embodiment. The mobile device 600 may include, for example, a smartphone. The mobile device 600 may include a display 604 and a camera 602. The mobile device 600 may perform similar functions as the portable computing device 100 described above, with the camera 602 capturing photographs and the display 604 changing appearance, and the mobile device 600 enhancing images based on the photographs, in response to the camera 602 and/or mobile device 600 rotating and/or moving, rather than the lid 102 rotating. The mobile device 600 may, for example, include an accelerometer, and may perform functions based on a determined angle or position of the mobile device 600 that are similar to the functions that the portable computing device 100 is described herein as performing based on the angle Θ and/or position of the lid 102 with respect to the base 104.

The mobile device 600 may include at least one processor and at least one memory device. The at least one memory device may include a non-transitory computer-readable storage medium comprising instructions stored thereon that, when executed by the at least one processor, cause the mobile device 600 to perform any combination of the functions, techniques, and method described herein with respect to the mobile device 600 or computing device.

Figure 7:
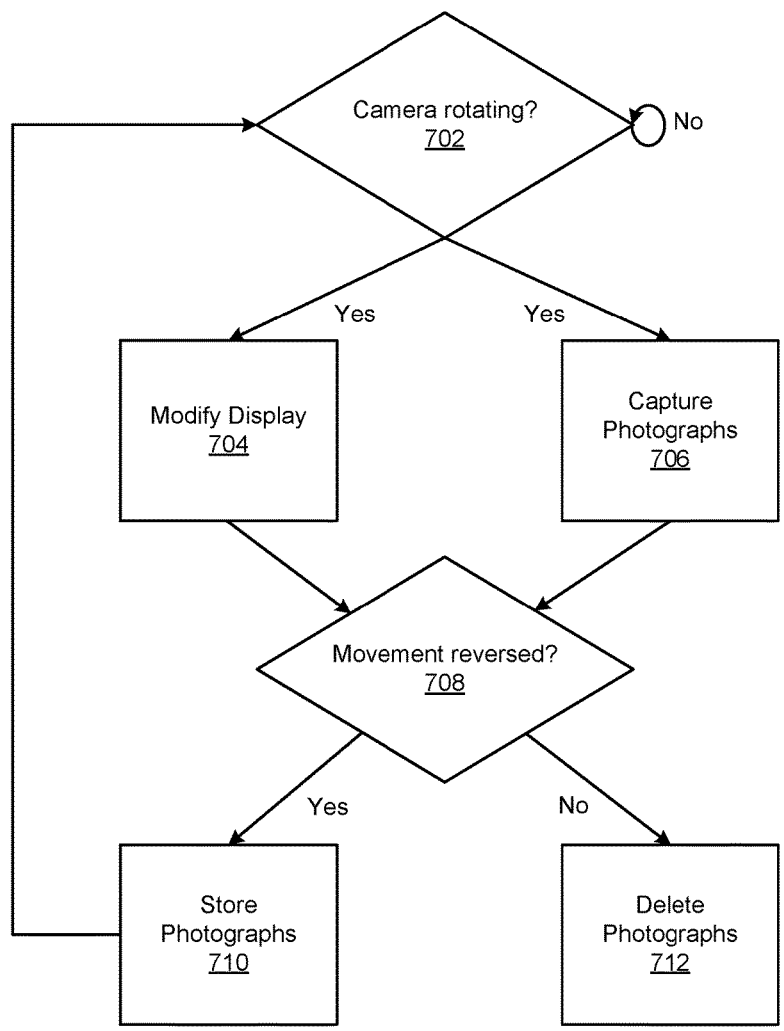
FIG. 7 is a flowchart showing a method performed by a computing device, such as the portable computing device or the mobile device, according to an example embodiment.

FIG. 7 is a flowchart showing a method performed by a computing device, such as the portable computing device 100 or the mobile device 600, according to an example embodiment. The method may include determining whether the camera 108, 602 is rotating (702). The camera 108, 602 may be determined to be rotating or not rotating based on whether the lid 102 is rotating toward the base 104 and/or whether the angle Θ is decreasing (such as based on sensor input within the hinge 202) and/or based on whether the mobile device 600 is rotating or moving (such as based on accelerometer input). If the camera 108, 602 is rotating, then the computing device may modify the display 106, 604 (704) and/or capture photographs (706).

The modifying the display 106, 604 (704) may include changing an appearance of the display 106, 604, such as by changing a brightness of the display 106, 604 and/or generating bright bands 406, 410 at different locations on the display 106, 604, as shown and described with respect to FIGS. 4A, 4B, 4C, and 4D. The display may be modified to a different appearance in association with each photograph captured by the camera 108, 602. The capturing photographs (706) may include capturing multiple photographs, which may be captured in association with the different states of the display 106, 604.

After and/or while modifying the display 106, 604 (704) and capturing photographs (706), the computing device may determine whether the direction of movement of the computing device has reversed (708). The computing device may determine whether the direction of movement of the computing device has reversed (708) based on whether the lid 102 begins rotating away from the base 104 (such as based on sensor input within the hinge 202) within the reopen time period 310, and/or based on whether a direction of movement of the mobile device 600 changes and/or reverse (such as based on accelerometer input). If the direction does not reverse, then the computing device may delete the photographs (712) captured during (706) and/or not process the photographs or generate an enhanced image based on the photographs. If the direction does reverse, then the computing system may store the photographs (710) and/or enhance the images, such as by sending the photographs to a specific drive or storage location.

Figure 8:
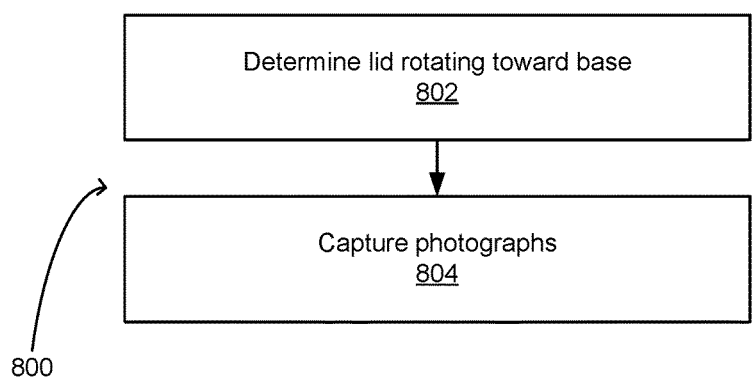
FIG. 8 is a flowchart showing a method performed by a computing device, such as the portable computing device or the mobile device, according to another example embodiment.

FIG. 8 is a flowchart showing a method 800 performed by a computing device, such as the portable computing device 100 or the mobile device 600, according to another example embodiment. According to this example, the method 800 may include determining that a front side 110 of a lid 102 is rotating toward a top side 116 of a base 104 (802). The method 800 may also include instructing the camera 108 to capture at least a first photograph and a second photograph based on the determination that the front side 110 of the lid 102 is rotating toward the top side 116 of the base 104 (804).

According to an example, the method 800 may also include increasing a brightness of a display 106 based on the determination that the front side 110 of the lid 102 is rotating toward the top side 116 of the base 104.

According to an example, the method 800 may also include the display 106 presenting a first image 402, 404, 406, 410 in association the camera 108 capturing the first photograph, and the display presenting a second image 402, 404, 406, 410 in association with the camera 108 capturing the second photograph, the second image 402, 404, 406, 410 being different than the first image 402, 404, 406, 410.

According to an example, a portion of the second image 402, 404, 406, 410 may have a different intensity of light than a corresponding portion of the first image 402, 404, 406, 410.

According to an example, a portion of the second image 402, 404, 406, 410 may have a different color than a corresponding portion of the first image 402, 404, 406, 410.

According to an example, the method 800 may also include the display 106 presenting a first bright band 406 and a first dark band or dark portion 408 in association with the camera 108 capturing the first photograph, and the display 106 presenting a second bright band 410 and a second dark band or dark portion 412 in association with instructing the camera 108 to capture the second photograph, the second bright band 410 being in a different location than the first bright band 406 and the second dark band or dark portion 412 being in a different location than the first dark band or dark portion 412.

According to an example, the method 800 may also the display 106 presenting a first bright band 406, with remaining portions 408 of the display 106 outside the first bright band 406 being dark, in association with the camera 108 capturing the first photograph, and the display 106 presenting a second bright band 410, with remaining portions 412 of the display 106 outside the second bright band 410 being dark, in association with the camera 108 capturing the second photograph, the second bright band 410 being in a different location on the display 106 than the first bright band 406.

According to an example, the method 800 may also include, after the camera 108 captured at least the first photograph and the second photograph, determining that the front side 110 of the lid 102 is rotating away from the top side 116 of the base 104, and perform high-dynamic range (HDR) imaging on the first photograph and the second photograph based on the determination that the front side 110 of the lid 102 is rotating away from the top side 116 of the base 104.

According to an example, the method 800 may also include, after camera 108 captured at least the first photograph and the second photograph, determining that the front side 110 of the lid 102 is rotating away from the top side 116 of the base 104, determining that the first photograph and the second photograph include text 120, 124 in addition to characters on the keyboard 112, and based on determining that the front side 110 of the lid 102 is rotating away from the top side 116 of the base 104 and that the first photograph and the second photograph include text 120, 124 in addition to the characters on the keyboard 112, performing high-dynamic range (HDR) imaging on the first photograph and the second photograph.

According to an example, the method 800 may also include, after the camera 108 captured at least the first photograph and the second photograph, determining that the front side 110 of the lid 102 is rotating away from the top side 116 of the base 104, determining that the first photograph and the second photograph include text 120, 124 in addition to characters on the keyboard 112, and based on determining that the front side 110 of the lid 102 is rotating away from the top side 116 of the base 104 and that the first photograph and the second photograph include text 120, 124 in addition to characters on the keyboard 112, storing the first photograph and the second photograph.

According to an example, the method 800 may also include, after the camera 108 captured at least the first photograph and the second photograph, determining that the front side 110 of the lid 102 is rotating away from the top side 116 of the base 104, determining that the first photograph and the second photograph include text 120, 124 in addition to characters on the keyboard 112, and based on determining that the front side 110 of the lid 102 is rotating away from the top side 116 of the base 104 and that the first photograph and the second photograph include text 120, 124 in addition to characters on the keyboard 112, storing the first photograph and the second photograph.

According to an example, the method 800 may also include, after the camera 108 captured at least the first photograph and the second photograph, determining that the front side 110 of the lid 102 is rotating away from the top side 116 of the base 104, determining that the first photograph and the second photograph include at least one object 118, 122 laying over the top side 116 of the base 104, and based on determining that the front side 110 of the lid 102 is rotating away from the top side 116 of the base 104 and that the first photograph and the second photograph include at least one object 118, 122 laying over the top side 116 of the base 104, storing the first photograph and the second photograph.

According to an example, the method 800 may also include, after the camera 108 captured at least the first photograph and the second photograph, determining that the front side 110 of the lid 102 is rotating away from the top side 116 of the base 104, and based on determining that the front side 110 of the lid 102 is rotating away from the top side 116 of the base 104 storing the first photograph and the second photograph.

According to an example, the method 800 may also include, after the camera 108 captured at least the first photograph and the second photograph, determine that the front side 110 of the lid 102 did not rotate away from the top side 116 of the base 104 within a reopen time period 310 after the camera 108 captured at least the first photograph and the second photograph, and based on determining that the front side 110 of the lid 102 did not rotate away from the top side 116 of the base 104 within the reopen time period 310, deleting the first photograph and the second photograph.

Figure 9:
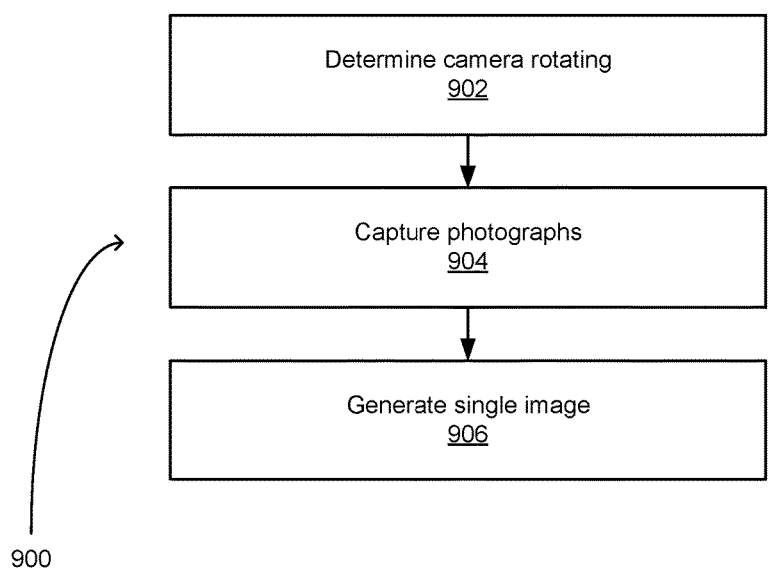
FIG. 9 is a flowchart showing a method performed by a computing device, such as the portable computing device or the mobile device, according to another example embodiment.

FIG. 9 is a flowchart showing a method 900 performed by a computing device, such as the portable computing device 100 or the mobile device 600, according to another example embodiment. According to this example, the method 900 may include determining that a camera 108, 602 included in the computing system, computing device, portable computing device 100, or mobile device 600 is rotating (902). The method 900 may also include capturing, by the camera 108, 602, at least a first photograph and a second photograph based on the determination that the camera 108, 602 is rotating (904). The method 900 may also include generating a single image based on the first photograph and the second photograph, the single image including only content that is included in both the first photograph and the second photograph (906).

According to an example, the generating the single image may include performing high-dynamic range (HDR) imaging on the first photograph and the second photograph.

Figure 10:
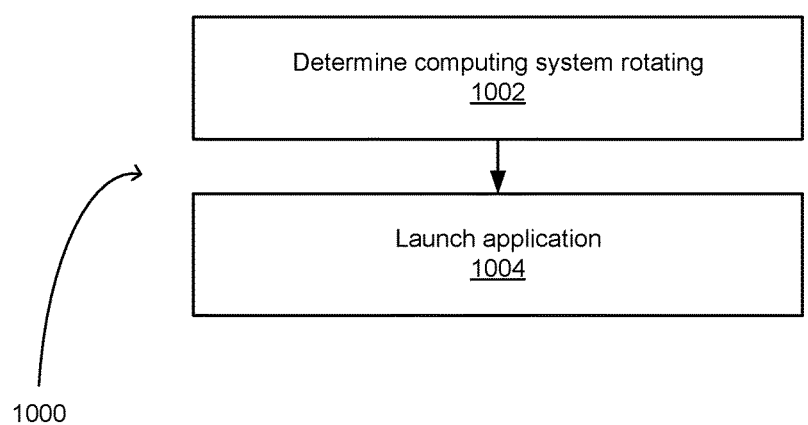
FIG. 10 is a flowchart showing a method performed by a computing device, such as the portable computing device or the mobile device, according to another example embodiment.

FIG. 10 is a flowchart showing a method 1000 performed by a computing device, such as the portable computing device 100 or the mobile device 600, according to another example embodiment. According to this example, the method 1000 may include determining that the computing system, computing device, portable computing device 100, or mobile device 600 is rotating (1002). The method 1000 may also include launching an application based on the determination that the computing system, computing device, portable computing device 100, or mobile device 600 is rotating. The application may configured to capture, by a camera 108, 602 included in the computing system 100, 600, at least a first photograph and a second photograph, and generate a single image based on the first photograph and the second photograph, the single image including only content that is included in both the first photograph and the second photograph.

Figure 11:
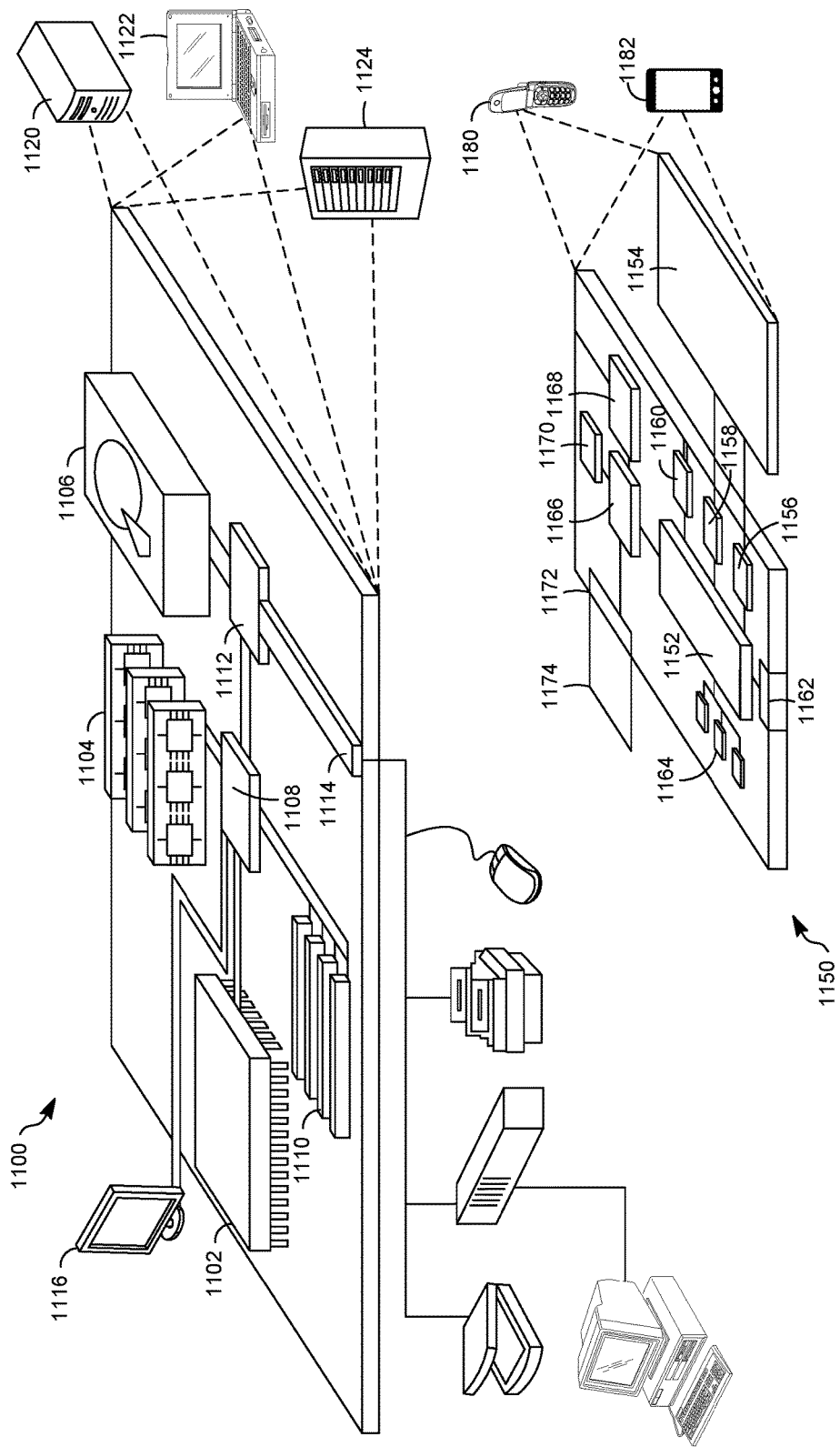
FIG. 11 shows an example of a computer device and a mobile computer device that can be used to implement the techniques described here.

FIG. 11 shows an example of a generic computer device 1100 and a generic mobile computer device 1150, which may be used with the techniques described here. Computing device 1100 is intended to represent various forms of digital computers, such as laptops (including the portable computing device 100 described above), desktops, tablets, workstations, personal digital assistants, televisions, servers, blade servers, mainframes, and other appropriate computing devices. Computing device 1150 is intended to represent various forms of mobile devices (such as the mobile device 100 described above), such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A portable computing device comprising:
    a lid comprising a display and a camera on a front side of the lid;
    a base comprising a keyboard on a top side of the base and a processor inside the base, the processor being coupled to the display, the camera, and the keyboard, the processor being configured to:
        determine that the front side of the lid is rotating toward the top side of the base; and
        instruct the camera to capture at least a first photograph and a second photograph based on the determination that the front side of the lid is rotating toward the top side of the base.

2. The portable computing device of claim 1, wherein the processor is further configured to increase a brightness of the display based on the determination that the front side of the lid is rotating toward the top side of the base.

3. The portable computing device of claim 1, wherein the processor is further configured to:
    instruct the display to present a first image in association with instructing the camera to capture the first photograph; and
    instruct the display to present a second image in association with instructing the camera to capture the second photograph, the second image being different than the first image.

4. The portable computing device of claim 3, wherein a portion of the second image has a different intensity of light than a corresponding portion of the first image.

5. The portable computing device of claim 3, wherein a portion of the second image has a different color than a corresponding portion of the first image.

6. The portable computing device of claim 1, wherein the processor is further configured to:
    instruct the display to present a first bright band and a first dark band in association with instructing the camera to capture the first photograph; and
    instruct the display to present a second bright band and a second dark band in association with instructing the camera to capture the second photograph, the second bright band being in a different location than the first bright band and the second dark band being in a different location than the first dark band.

7. The portable computing device of claim 1, wherein the processor is further configured to:
    instruct the display to present a first bright band, with remaining portions of the display outside the first bright band being dark, in association with instructing the camera to capture the first photograph; and instruct the display to present a second bright band, with remaining portions of the display outside the second bright band being dark, in association with instructing the camera to capture the second photograph, the second bright band being in a different location than the first bright band.

8. The portable computing device of claim 1, wherein the processor is further configured to, after instructing the camera to capture at least the first photograph and the second photograph:

determine that the front side of the lid is rotating away from the top side of the base; and perform high-dynamic range (HDR) imaging on the first photograph and the second photograph based on the determination that the front side of the lid is rotating away from the top side of the base.

9. The portable computing device of claim 1, wherein the processor is further configured to, after instructing the camera to capture at least the first photograph and the second photograph:

determine that the front side of the lid is rotating away from the top side of the base;

determine that the first photograph and the second photograph include text in addition to characters on the keyboard; and based on determining that the front side of the lid is rotating away from the top side of the base and that the first photograph and the second photograph include text in addition to the characters on the keyboard, perform high-dynamic range (HDR) imaging on the first photograph and the second photograph.

10. The portable computing device of claim 1, wherein the processor is further configured to, after instructing the camera to capture at least the first photograph and the second photograph:

determine that the front side of the lid is rotating away from the top side of the base;

determine that the first photograph and the second photograph include text in addition to characters on the keyboard; and based on determining that the front side of the lid is rotating away from the top side of the base and that the first photograph and the second photograph include text in addition to characters on the keyboard, store the first photograph and the second photograph.

11. The portable computing device of claim 1, wherein the processor is further configured to, after instructing the camera to capture at least the first photograph and the second photograph:

determine that the front side of the lid is rotating away from the top side of the base;

determine that the first photograph and the second photograph include text in addition to characters on the keyboard; and based on determining that the front side of the lid is rotating away from the top side of the base and that the first photograph and the second photograph include text in addition to characters on the keyboard, store the first photograph and the second photograph.

12. The portable computing device of claim 1, wherein the processor is further configured to, after instructing the camera to capture at least the first photograph and the second photograph:

determine that the front side of the lid is rotating away from the top side of the base;

determine that the first photograph and the second photograph include at least one object laying over the top side of the base; and based on determining that the front side of the lid is rotating away from the top side of the base and that the first photograph and the second photograph include at least one object laying over the top side of the base, store the first photograph and the second photograph.

13. The portable computing device of claim 1, wherein the processor is further configured to, after instructing the camera to capture at least the first photograph and the second photograph:

determine that the front side of the lid did not rotate away from the top side of the base within a reopen time period after instructing the camera to capture at least the first photograph and the second photograph; and based on determining that the front side of the lid did not rotate away from the top side of the base within the reopen time period, delete the first photograph and the second photograph.

14. The portable computing device of claim 1, further comprising a hinge rotatably connecting the lid to the base, the hinge comprising a sensor configured to sense that the front side of the lid is rotating toward the top side of the base and send a signal to the processor indicating that the front side of the lid is rotating toward the top side of the base.

15. A non-transitory computer-readable storage medium comprising instructions stored thereon that, when executed by at least one processor, are configured to cause a computing system to at least:

determine that a front side of a lid of the computing system, the front side of the lid including a camera, is rotating toward a top side of a base of the computing system, the base being rotatably connected to the lid; and capture, by the camera, at least a first photograph and a second photograph based on the determination that the front side of the lid is rotating toward the top side of the base.

16. The non-transitory computer-readable storage medium of claim 15, wherein the instructions are further configured to cause the computing system to:

determine that the front side of the lid rotated away from the top side of the base after the camera captured the first photograph and the second photograph; and store the first photograph and the second photograph based on the determination that the front side of the lid rotated away from the top side of the base after the camera captured the first photograph and the second photograph.

17. The non-transitory computer-readable storage medium of claim 15, wherein the instructions are further configured to cause the computing system to:

determine that the front side of the lid did not rotate away from the top side of the base within a reopen time period after the camera captured at least the first photograph and the second photograph; and based on determining that the front side of the lid did not rotate away from the top side of the lid within the reopen time period, delete the first photograph and the second photograph.

18. A non-transitory computer-readable storage medium comprising instructions stored thereon that, when executed by at least one processor, are configured to cause a computing system to at least:

determine that a camera included in the computing system is rotating;

display a first image and a second image based on the determination that the camera is rotating, the second image being different than the first image and being displayed after the first image;

capture, by the camera, at least a first photograph based on light from the first image and a second photograph based on light from the second image, based on the determination that the camera is rotating; and generate a single image based on the first photograph and the second photograph, the single image including only content that is included in both the first photograph and the second photograph.

19. The non-transitory computer-readable storage medium of claim 18, wherein the generating the single image comprises performing high-dynamic range (HDR) imaging on the first photograph and the second photograph.

20. A non-transitory computer-readable storage medium comprising instructions stored thereon that, when executed by at least one processor, are configured to cause a computing system to at least:

determine that the computing system is rotating; and launch an application based on the determination that the computing system is rotating, the application being configured to:

display a first image and a second image after the first image, the second image being different than the first image and being displayed after the first image;

capture, by a camera included in the computing system, at least a first photograph based on light from the first image and a second photograph based on light from the second image; and generate a single image based on the first photograph and the second photograph, the single image including only content that is included in both the first photograph and the second photograph.

21. A computer-implemented method comprising:

determining that a front side of a lid of a computing system is rotating toward a top side of a base of the computing system and toward a position in which the front side of the lid is facing the top side of the base, the front side of the lid including a camera and the top side of the lid including a keyboard, the lid being rotatably connected to the base;

capturing, by the camera, at least a first photograph and a second photograph based on the determination that the lid is rotating;

determining that the front side of the lid rotated away from the top side of the base after the camera captured the first photograph and the second photograph; and storing the first photograph and the second photograph based on the determination that the front side of the lid rotated away from the top side of the base after the camera captured the first photograph and the second photograph.

* * * * *